United States Patent [19]

Pichard et al.

[11] Patent Number: 4,609,519

[45] Date of Patent: Sep. 2, 1986

[54] PROCESSES FOR MAKING MOLDED COMPOSITE PANELS

[75] Inventors: Marcel Pichard, Gailleval; Pierre Brossy, Chalon Sur Saone, both of France

[73] Assignee: Isover Saint-Gobain, Courbevoie, France

[21] Appl. No.: 590,481

[22] Filed: Mar. 16, 1984

[30] Foreign Application Priority Data

Mar. 17, 1983 [FR] France ................. 83 04358

[51] Int. Cl.⁴ .................. B29C 43/20; B29C 49/22
[52] U.S. Cl. .................... 264/510; 264/517; 264/522; 264/112; 264/119; 264/120; 264/257; 264/258
[58] Field of Search ............. 264/510, 517, 522, 112, 264/119, 120, 257, 258

[56] References Cited

U.S. PATENT DOCUMENTS

| | | | |
|---|---|---|---|
| 3,054,714 | 9/1962 | Johnston | 264/510 X |
| 3,147,165 | 9/1964 | Slayter | 264/112 X |
| 3,244,783 | 4/1966 | Eissfeldt et al. | 264/112 |
| 3,825,642 | 7/1974 | Kies | 264/510 |
| 3,891,738 | 6/1975 | Shen | 264/120 X |
| 4,115,498 | 9/1978 | Kissell | 264/119 |
| 4,131,664 | 12/1978 | Flowers et al. | 264/510 |
| 4,273,981 | 6/1981 | Nopper | 264/120 X |
| 4,379,101 | 4/1983 | Smith | 264/119 X |

*Primary Examiner*—Jan Silbaugh
*Attorney, Agent, or Firm*—Oblon, Fisher, Spivak, McClelland & Maier

[57] ABSTRACT

To produce a panel of variable thickness, a stratified assembly of a layer of fibers containing a non-polymerized binder and at least one cover sheet is placed between the mold and mold-backing of a molding press. The stratified assembly is caused to conform to the interior surface of the mold or mold-backing by forcing the cover sheet against the mold or mold-backing interior. Hot air is blown into the fiber layer from the mold surface opposite the cover sheet, into at least the region that will correspond to the area of greater thickness. The direction of the heated air is reversed after a period of time, the blowing of the air being maintained and adjusted in order to secure polymerization of the binder. At the same time, the portions of the panel corresponding to areas of lesser thickness, generally the edges of an acoustical panel, are cured (the binder polymerized) by contact heating means. To effect cross-over blowing, both the mold and mold-backing are provided with ports through which heated air may be blown or passed.

11 Claims, 6 Drawing Figures

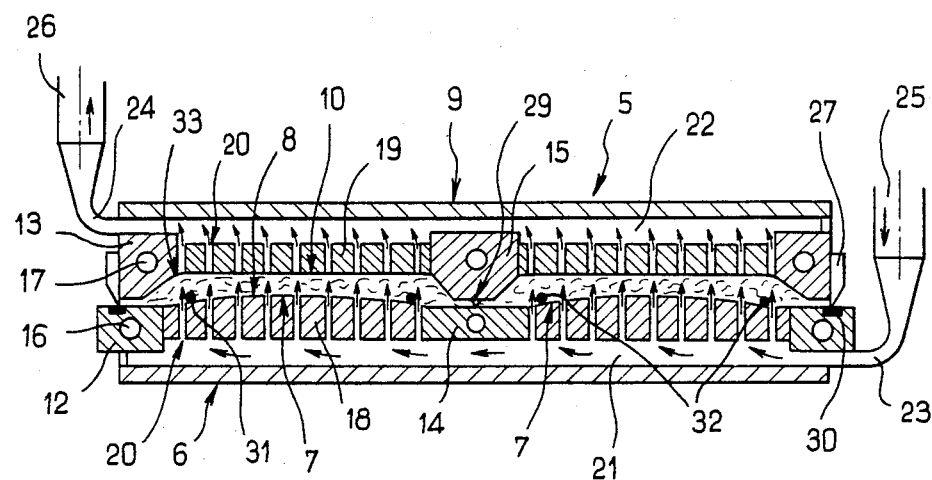
FIG_3
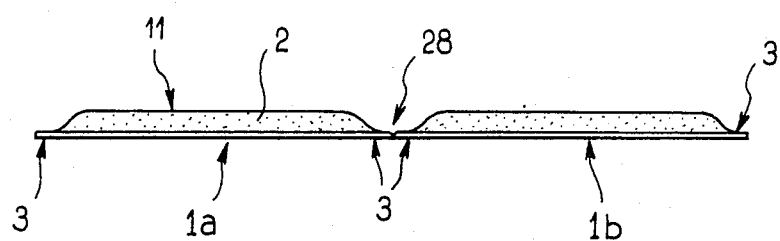
FIG_4

PROCESSES FOR MAKING MOLDED COMPOSITE PANELS

BACKGROUND OF THE INVENTION

1. Field of the Invention

The invention concerns variable-thickness molded composite panels comprising a base layer of bound fibers and a cover sheet, particularly acoustical panels having at least one thick portion for absorbing sounds and other thinner, rigid portions, notably the edges, that serve particularly for mounting the panels. More specifically, the invention concerns a process and means for producing such panels.

Examples of composite panels of this type are stationary, removable, or movable baffles or screens that may be hung from the ceiling, formed into walls, etc., or made into hood-liners or interior fittings for the roofs of motor vehicles.

2. Description of the Prior Art

Composite acoustical panels are made by molding a piece of raw material, i.e., a bed or layer of fibers impregnated with a nonpolymerized binder (generally a thermosetting resin). The raw material is covered on at least one side by a cover sheet lending the desired characteristics to the finished product, e.g., an aesthetic appearance. Said cover sheet is bound to the layer of fibers in a one-step press-molding operation that takes place simultaneously with the polymerization of the binder.

One of the problems encountered in the one-step molding of composite panels of the type described above stems from the difficulty of obtaining rapid, complete, and uniform polymerization in the thick, absorbent portion of low fiber-density as well as in the other parts (notably the thin edges) that are of high fiber-density.

In conventional press-molding, the composite is heated by conduction resulting from contact with the heated mold and mold-backing, which requires a long molding period for the thick section, a period which is not necessary for, and even harmful to, the thinner edges. To overcome this problem it has already been proposed to blow hot air through the pad during molding so that the heat necessary for polymerization is brought quickly into the center of the pad and the length of the operation is thereby reduced.

Another problem encountered in the molding of variable-thickness composite panels lies in obtaining the correct conformation of panel to mold, particularly when the latter contains sharp angles and/or curves and large variations in thickness.

To date, known molding processes do not make it possible to produce composite panels (and particularly acoustical panels) having simultaneously a good appearance and a shape that is consistent from one panel to the next (particularly for highly curved shapes and where the absorbent section is very thick) while at the same time retaining a minimal pressing time compatible with industrial production, e.g., two minutes, thirty seconds or less.

The invention disclosed and claimed herein, overcomes these drawbacks and offers a process for the industrial production of such composite panels.

SUMMARY OF THE INVENTION

In accordance with the invention, the process comprises the following operations:

a stratified assembly comprising at least one piece of raw material, i.e., a layer of fibers containing a nonpolymerized binder, and at least one cover sheet is pressed between a mold and mold-backing;

the stratified assembly is made to conform to the shape of the mold or mold-backing by applying the cover sheet and the adjacent part of the raw material against the mold or mold-backing surface that corresponds to the surface of the panel that will later be visible;

hot air is blown into at least the thick section of the stratified assembly, entering from the side opposite the cover sheet;

the hot air flow is adjusted to supply the amount of heat needed for a uniform and quick polymerization of the binder; while the thin, dense sections of the stratified assembly are simultaneously heated by contact.

The blowing operation is characterized by comprising at least two phases, the first blowing the hot air into the material to be molded from the side opposite the cover sheet, the second phase involving blowing in the reverse or opposite direction.

The phase of shaping the stratified assembly may be combined with the first blowing phase, particularly when the hot-air blowing operation under the invention is cross-over blowing, i.e., when the hot air enters from the side opposite the cover sheet, crosses over the laminate, and exits from the cover sheet side.

A change in the blowing operation designated herein by the phrase "second blowing phase" comprises a reversal of the direction of blowing phase.

In a variant, the phase of shaping the stratified assembly consists of pressurizing the assembly by forcing air into the mold and preventing at least part of it from escaping.

The first hot-air blowing phase may also consist of a partial cross-over blowing, with the hot air being introduced through ports provided in the mold or mold-backing on the side opposite the cover sheet and escaping on the same side through additional ports. Modification of the blowing operation may then consist of reversing the ports, with the outlet ports in the first phase becoming the hot-air intake ports in the second, and vice versa.

Other combinations of cross-over and partial cross-over blowing may also be envisioned.

Reversal of the blowing direction offers still another advantage since in the case of cross-over blowing it can facilitate the later removal of the composite panel from the mold.

During molding, the blowing of air may be changed several times on condition that one begins with the first blowing phase described above. Thus in the case of cross-over from the side opposite the cover sheet, the blowing is then reversed once and possibly twice.

Generally, a single change, i.e., a single reversal of the direction of blown air, is sufficient during the entire pressing operation.

The overall duration of the molding operation is generally less than two minutes and thirty seconds. The duration of each of the air blowing phases may vary where more than one air blowing phase is practical, with the first phase possibly being combined with the shaping phase so long as it remains of sufficient duration to set the shape of the panel. For example, with a total pressing time of 90 seconds and using cross-over blowing, one might first blow toward the cover sheet for 60 seconds and then away from it for 30 seconds.

The temperature of the blown air may vary considerably depending on the heat required for rapid polymerization of the binder and on the temperatures tolerated by the cover sheet. Generally, temperatures of between 150° C. and 300° C. are used. The flow of blown air may be on the order of 1,000 to 10,000 m³/hour (measured under normal conditions) according to the size and density of the panel. The speed of the blown air may be on the order of 0.1 to 10 meters per second.

To practice the invention to produce acoustical panels used in the building industry, i.e., to construct symmetrical panels that can be used in various positions and thus must have both faces covered with a so-called facing sheet, two half-panels are produced and later joined together.

These two half-panels may be produced at different times but are advantageously made simultaneously in the course of a single molding operation. Operating conditions will therefore be identical and the two half-panels will have the same mechanical and esthetic characteristics.

According to a characteristic of the invention, the two half-panels are constructed from a single piece of raw material and a single sheet of covering. To facilitate the later joining of the two half-panels, they are kept connected during molding, with the line of connection acting as a sort of hinge.

The invention can therefore be particularly advantageously applied to the production of a variable-thickness composite panel such as an acoustical panel that is symmetrical with respect to its principal plane, is between 60 and 150 mm thick, is formed by joining two half-panels that may have a more or less marked hollow interior shape, and is made from a piece of fibrous raw material containing a binder and covered with a facing sheet that is air-permeable.

According to another characteristic of the invention, the panels or half-panels are cut to final size during molding. Advantageously, the edges are sealed or crimped in the course of the same operation.

The raw material used in practicing the invention may be based on glass, rock, or slag fibers or on any other type of fiber that will withstand the molding temperatures. The binder contains a resin that is generally thermosetting, such as a phenoplastic or aminoplastic resin. Preferentially, a phenoplastic resin is used that stands up well under the the relatively high temperatures necessary during molding (which may be on the order of 150° C. to 300° C., preferably 150° C.–180° C.), resists humidity, and is low in cost. The binder content of the raw material is generally on the order of 8% to 30% by weight.

These phenoplastic resins may be phenolformaldehyde resins of the resol type, possibly modified with urea and having a molecular ratio of formaldehyde to phenol of between 1 and 5, catalyzed in an alkaline medium with alkaline or alkaline-earth hydroxides, and neutralized to pH 7 at the end of the cycle by addition of diluted sulfuric acid. Advantageously, a resin is used with a pH of approximately 1.5 to 3 or 8.5 to 12, prepared from the basic pH 7 resin, since these reins demonstrate even better polymerization characteristics (particularly relatively low reticulation temperatures, on the order of 150° C. to 180° C. for relatively brief reticulation periods of one and a half to two minutes for the thickness and weights of the fiber layers used in the invention.)

The cover sheet may be made of woven or unwoven natural or synthetic fibers. It must be porous or permeable to air, both to allow air to pass through during the blowing operation and to allow the [inner] fibers to play their sound-absorbent role.

The cover must be malleable so as to be able to conform to the shape of the mold. It must be able to withstand the previously indicated molding temperatures. In addition, its texture must allow for the cutting and sealing of the edges.

The laminate to be molded may also include a cover sheet for the surface of the panel that is later to be hidden. This sheet facilitates handling of the panel, spares handlers direct contact with the fibers, and may also improve the rigidity of the molded panel.

The laminate to be molded may also include other constitutive elements such as a thermoplastic film which, placed between the face cover sheet and the piece of fibrous raw material, is used as an adhesive to improve the bond between the two elements. Of course, in this case the blowing operation undertaken under the invention will be of the partial cross-over type. A thermoplastic grid, e.g., of polyethylene, may be substituted for the thermoplastic film in order to allow for full cross-over blowing.

The invention further concerns means for practicing the process.

Said means comprises a press equipped with two plates, one bearing a mold and the other a mold-backing, with the active surface of the mold (or of the mold-backing) having a shape that conforms to the desired outward facing surface of the panel or half-panel to be produced, while the active surface of the mold-backing (or mold) has a shape that conforms to the unseen surface of the panel or half-panel to be produced. At least the mold or mold-backing acting on the unseen surface of the panel has ports or holes in those of its parts that correspond to the sound absorbent sections of the panels or half-panels, said ports being provided for the passage of hot air to be blown through them in the course of the molding operation. The means of the invention also comprises a hot-air blowing system linked to the aforesaid ports, blades for cutting the panel during molding, conduction heat elements for the contact parts of the mold and mold-backing i.e., the parts corresponding to the dense parts of the panel, particularly in the vicinity of the edges, with said heating elements possibly disposed either within the material of the mold or mold-backing or in the plates of the press.

In an embodiment of said means using cross-over blowing of hot air, the mold and mold-backing are both provided with ports in those of their sections that correspond to the thick parts of the panels or half-panels to be produced.

In a variant using partial cross-over blowing of hot air, only the mold or mold-backing that acts upon the unseen surface of the panel or half-panel is provided with ports for the passage of hot air.

When the elements for heating the contact parts of the mold or mold-backing are built into the latter, they may consist of electrical resistance devices or, advantageously, of elements for the circulation of a heated liquid such as oil that will ensure better uniformity of temperature throughout the contact parts.

Particularly in the production of a panel by simultaneous molding of two half-panels using a single mold, when these two half-panels have sharp angles between the thin, dense sections and the thick, absorbent parts, the mold that defines the inner form of the panel is advantageously equipped with mechanical means such as one or more tube belts in order to obtain well defined shapes.

Other characteristics and advantages of the invention will be apparent from the following description of embodiments of the means of the invention.

BRIEF DESCRIPTION OF THE DRAWINGS

FIG. 3 is a cut-away side view of part of a device making use of cross-over blowing of hot air.

FIG. 4 illustrates the product obtained through use of the means of FIG. 3.

DETAILED DESCRIPTION OF THE INVENTION

Figure 1:
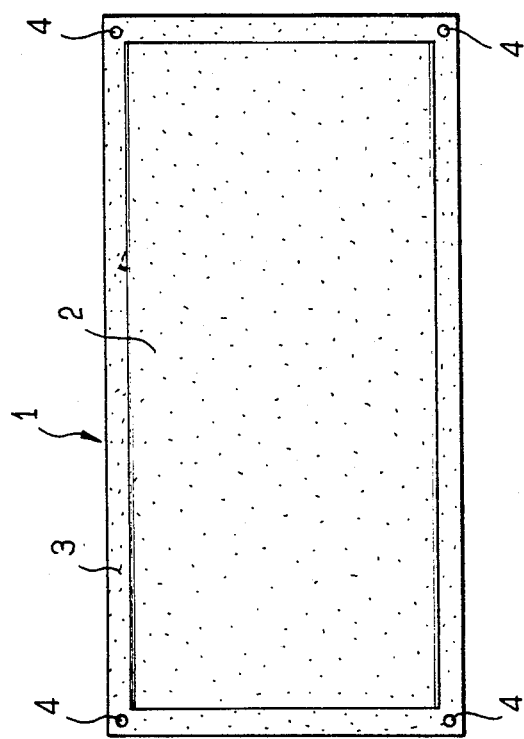
FIG. 1 is an illustration of a plane view of an acoustical panel formed from two identical half-panels.
Figure 2:
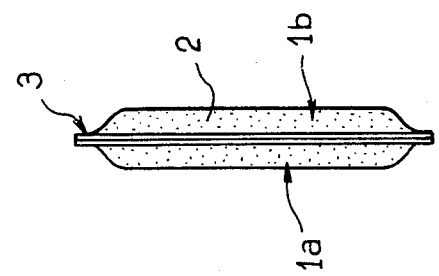
FIG. 2 illustrates the panel of FIG. 1 in a side view.

FIGS. 1 and 2 represent a rectangular acoustical panel 1 approximately 1,200 mm long, 750 mm wide, 120 mm thick in the thick, absorbent section 2, and 5 mm thick in the dense peripheral sections 3, having four holes 4 for grommets at the four corners used for fastening the panel in place for use. Said panel is formed from two identical half-panels 1a, 1b. The panel's composition is described hereinbelow.

FIG. 3 illustrates (in closed position) a mold 5 for the simultaneous production of two acoustical half-panels 1a, 1b and is thus symmetrical about a median plane. The lower part 6 constitutes the actual mold, the doubly convex curved shape 7 of which corresponds to the lower surface 8 of the half-panels. The upper part 9 constitutes the mold-backing, the doubly concave curved shape 10 of which corresponds to the upper surface 11 of the half-panels that will be the outer part of the final panel obtained by assembling the two half-panels. The edges 12, 13 and the central section 14, 15 of the mold and mold-backing respectively correspond to the dense parts of the half-panels which are contact-molded. They have heating elements within them, e.g., conduits 16, 17 through which travels a heated fluid. Parts 18 and 19 of the mold and mold-backing respectively correspond to the thick, absorbent sections of the half-panels and contain holes 20 for the circulation of hot air through the half-panels. These holes are connected to longitudinal grooves 21 and 22 provided in the mold and mold-backing, which grooves are connected in turn to blowing and suction nozzles 23 and 24, respectively, mounted at the end of hot air supply conduits 25 and 26. Blades 27 are set up around the periphery of the mold-backing to cut the half-panels, which remain connected by a line of attachment at line 28 formed by a central punch 29. Directly below blades 27, the mold comprises a very hard piece 30 fastened to the edges and serving as an "anvil" for the cutting operation. On the mold at the spots corresponding to the peripheral corners of the panel, i.e., at the borders of the thick sections, tubes 31, 32 are provided and form two belts that during the molding operation help conform the peripheral corners 33 of the panel to the shape of the mold-backing during the phase of forced-air shaping.

The mold is mounted on the stationary table of a press (not shown), while the mold-backing is mounted on a vertically movable plate (also not shown) of the same press.

FIG. 4 represents the two half-panels produced through use of the means described above, said two half-panels remaining joined along line of attachment 28, which forms a hinge.

Figure 5:
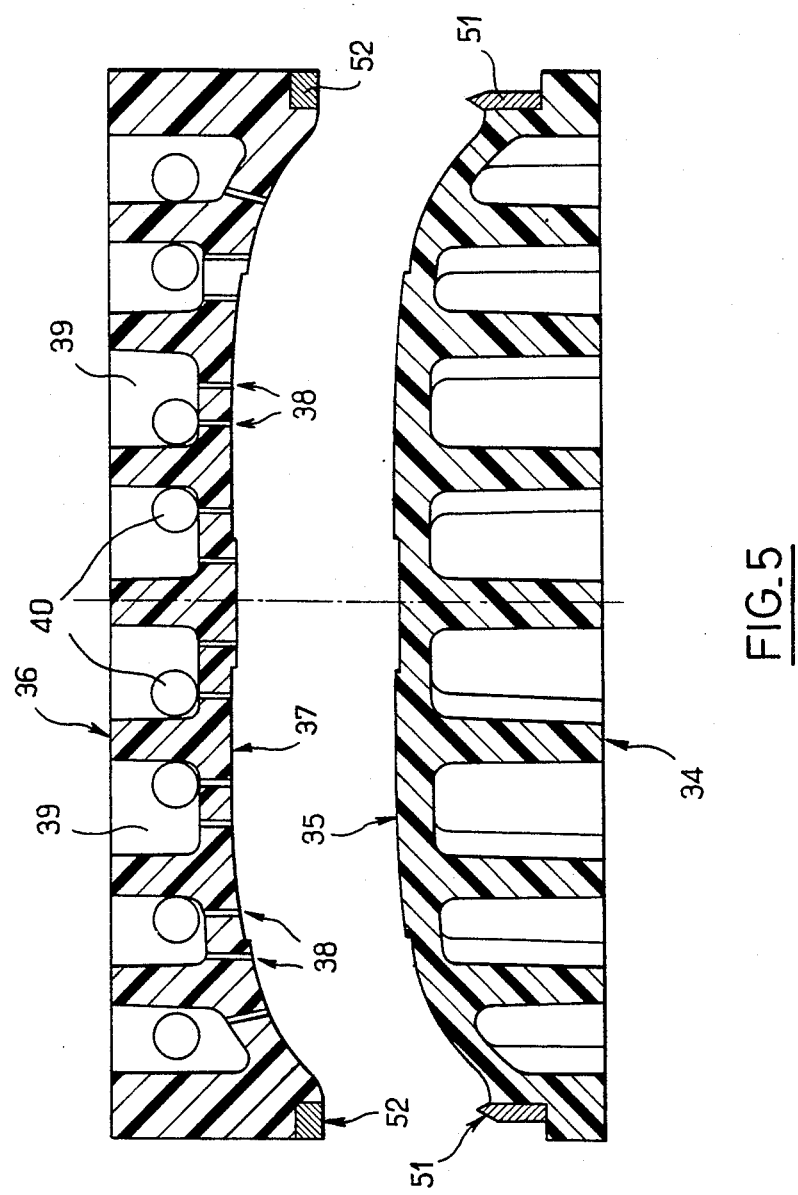
FIG. 5 representationally illustrates the mold and mold-backing of a device making use of partial cross-over blowing [of hot air].

FIG. 5 represents a mold (in open position) in an embodiment of the means of the invention making use of partial cross-over blowing, which may be used to produce an interior fitting for the roof of a motor vehicle. The lower part 34 forming the actual mold has a shape 35 that conforms to the surface of the panel (not shown) that will later be visible and be covered with fabric. The upper part 36 forming the mold-backing has a shape 37 that conforms to the surface of the panel that will later be hidden. Mold-backing 36 contains holes 38 spread over its entire surface, with the exception of the edges. Said holes 38 are several millimeters in diameter and originate at the bottom of longitudinal grooves 39 provided in the structure of mold-backing 36. At the end of each longitudinal groove 39 are provided holes 40, approximately 50 mm in diameter, in the lateral walls of the mold-backing. These holes may be connected to a nozzle 42 forming part of the air supply circuit represented in FIG. 6, with said nozzle being mounted at the end of an air intake conduit 43. At the other end of each groove, holes 44 are provided. These may be connected to another nozzle 45 mounted at the end of an exhaust conduit 46 for removing the air.

An air distribution system, comprising on each side slide-valve 47, 48 placed between ports 40, 44 and nozzles 42, 45 and containing holes that may be made to correspond to the ports 40, 44 that flow into grooves 39, distributes blown or suctioned air into every other groove according to the position of said slide-valves. The valves are mounted on the shafts of actuators 49, 50 that control their position. Blades 51 are mounted at the periphery of the mold to cut the panel as it is being molded, with said blades coming to rest against anvils 52 and having a shape suitable for the simultaneous sealing of the edges.

Figure 6:
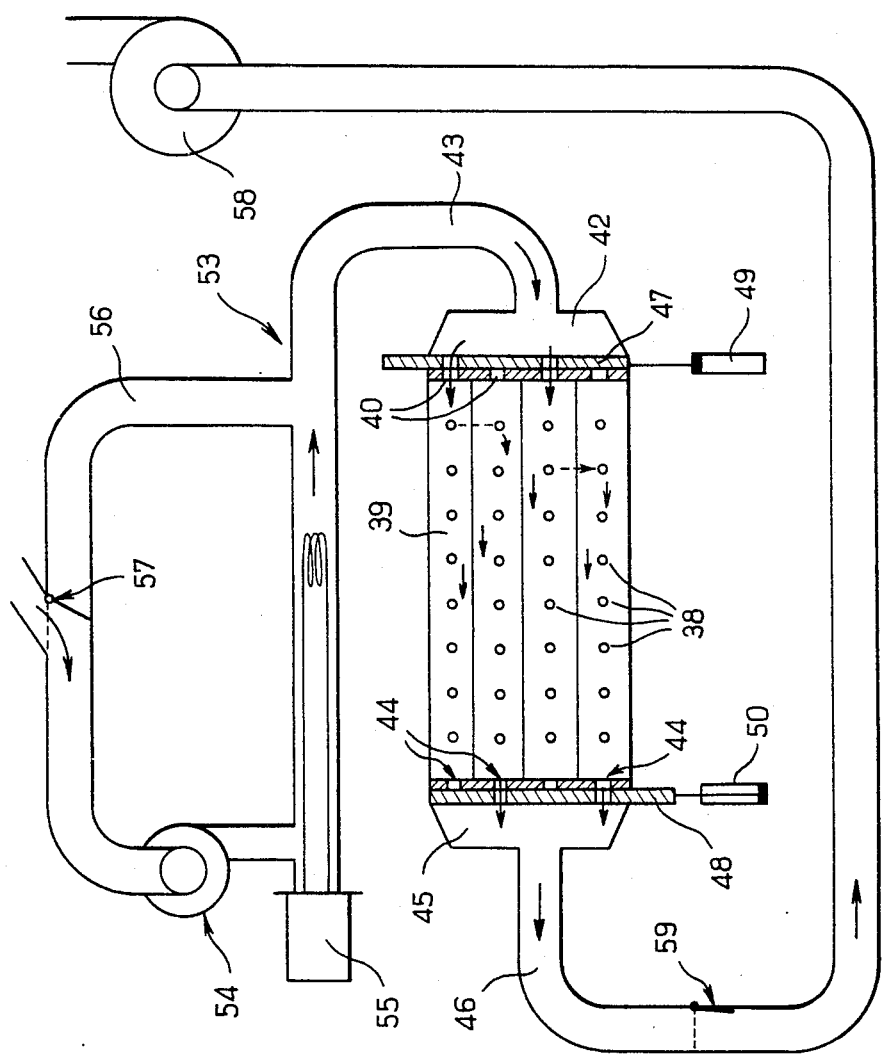
FIG. 6 is a schematic representation of an air-blowing circuit joined with the mold and mold-backing represented in FIG. 5.

The air supply circuit 53 represented in FIG. 6 comprises the previously described blowing and suctioning nozzles 42 and 46, respectively, provided at the end of supply and exhaust conduits 43 and 46, respectively. A blower fan 54 and a reheater 55 are set up on the supply conduit. The supply conduit comprises a shunted recycling section 56 that makes it possible to accumulate hot air while the mold is open. Air is introduced into the circuit by means of a three-way valve 57 that depending on its position opens or closes shunted section 56.

A second fan 58 is mounted on the exhaust conduit 46, which has a controlled flap-valve 59.

The operation of the means of the invention will be described below with reference to the production of an interior roof fitting.

Examples of the production of molded composite panels under the invention are given below for illustration purposes only, and are not intended to limit the invention.

EXAMPLE 1

A rectangular acoustical panel is to be produced as shown in FIGS. 1 and 2. It is 1,200 mm long, 750 mm wide, 120 mm thick in the thick, absorbent section, and 5 mm thick in the dense area, and has four holes for grommets at the four corners of the dense area, with said grommets being used to fasten the panel in place for use.

Into the means illustrated in FIG. 3 is placed a piece or original of fiberglass raw material with a surface density of 1,500 g/m$^2$ and a phenoplastic resin-based binder content of 17% by weight.

The resin is of the resol type modified with urea and having a molecular ratio of formaldehyde to phenol of approximately three. It is catalyzed in an alkaline medium and has a pH of seven.

The piece of raw material or original is covered with an unwoven cotton covering and rests on an unwoven polyester backing that facilitates handling. The raw material is approximately 150 mm thick.

The assembly is placed between the mold and mold-backing of the press. The molding is done with stops set so as to obtain the desired thicknesses. Duration of molding is 90 seconds.

During the molding operation the portions of the two half-panels having high fiber-density are heated through contact with the corresponding parts of the mold and mold-backing, which are themselves heated to 200° C. by high-temperature oil circulating through them. The thick, sound absorbent sections are heated by blowing hot air at approximately 200° C. and at a pressure of 3,000 m$^3$/h (measured under normal conditions), first from below, i.e., from the backing toward the cover sheet that will be seen, for 60 seconds, which has the effect of rapidly polymerizing the binder and giving the panel the desired outer shape, an operation that is further accentuated by the mechanical action of tube belts 31 and 32. The direction in which the hot air is blown is then reversed for the remaining 30 seconds, further accelerating the polymerization of the binder and facilitating the removal of the surface from the mold-backing. At the outset of the molding operation, outer blades 27 cut the edges of the half-panels while simultaneously sealing them, while at the center of the mold the upper plate creates a line of attachment that forms a hinge. At the end of the molding operation, the mold-backing is raised and the two half-panels—whose hidden surface is hollowed slightly—are removed and joined together by folding them along the line of attachment.

The resulting panel has a good appearance, its shape is well defined, the cover fabric is intact, and the edges and grommet holes are perfectly sealed.

The two following examples are comparative examples in which not all of the shaping and blowing phases of the invention are used.

EXAMPLE 1a

An acoustical panel is produced in the same manner as in Example 1 except that the direction of blowing is not reversed.

The panel obtained, which is difficult to remove from the mold, has the proper shape but its mechanical characteristics, particularly its rigidity, are not satisfactory due to incomplete polymerization of the binder.

EXAMPLE 1b

An acoustical panel is produced in the same manner as in Example 1 except that air is blown first in the opposite direction, i.e., from the cover sheet toward the backing, and is then reversed.

The shape of the resulting panel is imperfectly defined between thick and thin portions.

EXAMPLE 2

An acoustical panel suitable for use as a hood-liner for a motor vehicle is to be produced. It is approximately 1,400 mm long, 900 mm wide, 40 mm thick through its thick section, and approximately 4 mm in its thin sections.

For this purpose, a piece of fiberglass raw material is used having a surface density of 1,100 g/m$^2$ and phenoplastic resin-based binder content of 17% by weight as described in Example 1. The raw material is covered with a pricked fabric on the side that is to be visible, while the side that will remain unseen rests on an unwoven backing.

The assembly is placed into the mold. The duration of the pressing is 80 seconds, during which hot air at 240° C. is blown in at a rate of 3,000 m$^3$/h (measured under normal conditions), first toward the cover sheet for 45 seconds and then in the opposite direction. The molded hood liner has the desired characteristics.

EXAMPLE 3

An interior roof fitting for a motor vehicle is to be produced using the means illustrated in FIGS. 5 and 6.

A piece of fiberglass raw material is used having a surface density of 800 g/m$^2$ and a phenoplastic reinbased binder content of 15% by weight as described in Example 1, except that it has a pH of 9.2. The raw material is covered with a polyester fabric cover sheet over a sheet of polyvinyl chloride and rests on an unwoven fabric used as a hidden backing.

The stratified assembly is placed in the mold, with the cover sheet arranged to face mold 34. After closing the mold, three-way valve 57 is used to close the recycling circuit and air is introduced into the supply circuit by switching on fan 54. With the exhaust circuit closed by flap-valve 59, the mold is pressurized. At the end of approximately 35 seconds, valve 59 is opened and, after fan 58 is activated, air heated by reheater 55 may the circulate within the composite panel, being introduced through ports 40 in every other groove of the mold-backing and, after moving into the composite panel, escaping through the remaining grooves and ports 44 toward the exhaust circuit. After 40 seconds of blowing/suctioning, the blowing operation is changed by simultaneously activating actuators 49 and 50 that act upon slide-valves 47 and 48 so as to place the holes in the slide-valves opposite the previously unused ports 40 and 44. The flow of air within the composite panel is thereby reversed. After an additional 40 seconds, the three-way valve is placed in recycling position, flap-valve 59 is closed, the mold is opened, and the molded composite panel is removed. It is of good appearance and has good mechanical properties.

The two following examples are comparative examples lying outside the invention.

EXAMPLE 3a

One proceeds in the same manner as in Example 3 except that the direction of the blown air is not changed. After a molding period identical to that of Example 3, a molded composite panel is obtained that does not show uniform polymerization, particularly in the vicinity of the blowing nozzles, where there exist overheated zones, while in other sites polymerization remains inadequate.

EXAMPLE 3b

One proceeds in the same manner as in Example 3, except that the initial pressurization is not carried out. The molded panel which results has an unsatisfactory appearance, particularly in that the corners are insufficiently defined.

The process and apparatus of this invention have been disclosed above with reference to particular embodiments and examples. Particular materials, densities, flow rates, etc. recited are not intended to be limiting unless they are so indicated. Variations will occur to those of ordinary skill in the art, and remain within the scope of the invention as claimed below.

What is claimed is:

1. A one step molding process for the production of a composite panel of variable thickness comprising a fiber backing and a cover sheet, said panel having at least one area of greater thickness and one area of lesser thickness, said process comprising:

placing a stratified assembly comprising a first layer of fibers and a non-polymerized binder and a second layer comprising an air permeable cover sheet thereover between a mold and mold-backing which are mutually shaped to define said areas of greater and lesser thickness;

conforming said stratified assembly to the shape of said mold or mold-backing by applying said assembly thereagainst;

blowing heated air by cross-over blowing into the assembly only in the area corresponding to said area of greater thickness, said air being blown into said assembly from side opposite said cover sheet; thereafter reversing the direction of said blown air, said blowing being maintained for sufficient time and at sufficient temperature to polymerize said binder; and contact heating the areas of said assembly corresponding to said area of lesser thickness.

2. The process of claim 1, wherein said conforming is effected by said blowing step, thereby forcing said cover sheet against said mold or mold-backing.

3. The process of claim 1, wherein the combined duration of said conforming and blowing phases is less than about 2 minutes, 30 seconds.

4. The process of claim 1, wherein said variable thickness is caused, in part, by the use of tube belts within said molds, thereby accenting the difference between said area of greater thickness and said area of lesser thickness.

5. The process of claim 1, wherein said area of lesser thickness includes the edges of said panel, which edges are sealed during said molding process by said contact heating.

6. The process of claim 1, wherein said mold and molding-backing define two identical half-panels, said process thereby simultaneously producing two half-panels from a single piece of said stratified assembly, said two half-panels being produced under identical conditions.

7. The process of claim 6, wherein said half-panels are maintained in connection with one another by formation of a line of lessened thickness therebetween during said molding process, said line being defined by corresponding portions of said mold and mold-backing.

8. The process of claim 1, wherein said conforming of said stratified assembly to the shape of said mold or mold-backing and said blowing of air into the assembly, in both initial and reverse directions, is maintained for sufficient time to completely cure the panel to its final form.

9. The process of claim 1, wherein said blown air is heated to a temperature of approximately 150° C.–300° C., and is blown at approximately 1,000–10,000 $m^3$/hour.

10. The process of claim 1, wherein said stratified assembly further comprises a layer of thermoplastic material between said fiber layer and said cover sheet.

11. A one-step molding process for the production of a composite panel of variable thickness comprising a fiber backing and a cover sheet, said panel having at least one area of greater thickness and one area of lesser thickness, said process comprising the steps of:

placing a stratified assembly comprising a first layer of fibers and a non-polymerized binder and a second layer comprising a cover sheet thereover between a mold and mold backing which are mutually shaped to define said areas of greater and lesser thickness;

conforming said stratified assembly to the shape of said mold or mold backing by pressurization of the mold defined thereby, said pressurization being effected by forcing air into the mold while preventing exhaust thereof thereafter, blowing heated air by partial crossover blowing into the assembly only in the area corresponding to said area of greater thickness, said air being blown into said assembly from the side opposite said cover sheet, and escaping on the same side, thereafter reversing the direction of said blown air with the air inlets in the first blowing phase becoming the air outlets of said reverse blowing phase, said blowing being maintained for sufficient time and at sufficient temperature to polymerize said binder, and contact heating the areas of said assembly corresponding to said area of lesser thickness.

* * * * *